United States Patent
Zhou et al.

(10) Patent No.: US 12,074,002 B2
(45) Date of Patent: Aug. 27, 2024

(54) FLAT FORCE BLOW-ON SWITCH

(71) Applicant: Cummins Power Generation IP, Inc., Minneapolis, MN (US)

(72) Inventors: Wangwei Zhou, Shoreview, MN (US); Lokesh J. Yadav, Shoreview, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 237 days.

(21) Appl. No.: 17/620,489

(22) PCT Filed: Jun. 18, 2020

(86) PCT No.: PCT/US2020/038457
§ 371 (c)(1),
(2) Date: Dec. 17, 2021

(87) PCT Pub. No.: WO2020/257470
PCT Pub. Date: Dec. 24, 2020

(65) Prior Publication Data
US 2022/0344110 A1    Oct. 27, 2022

Related U.S. Application Data

(60) Provisional application No. 62/864,544, filed on Jun. 21, 2019.

(51) Int. Cl.
*H01H 1/22* (2006.01)
*H01H 9/46* (2006.01)

(52) U.S. Cl.
CPC ............ *H01H 1/225* (2013.01); *H01H 9/46* (2013.01); *H01H 2300/018* (2013.01)

(58) Field of Classification Search
CPC .. H01H 3/02; H01H 3/00; H01H 3/16; H01H 3/32; H01H 3/42; H01H 3/60;
(Continued)

(56) References Cited

U.S. PATENT DOCUMENTS 3,588,412 A    6/1971   Koennecke et al.
10,163,585 B2 *  12/2018   Zhou ...................... H01H 77/10
(Continued)

FOREIGN PATENT DOCUMENTS

KR    20060036988    5/2006

OTHER PUBLICATIONS

International Search Report and Written Opinion on International Application No. PCT/US2020/038457, mail date Sep. 17, 2020, 12 pages.

*Primary Examiner* — Anthony R Jimenez
(74) *Attorney, Agent, or Firm* — Foley & Lardner LLP

(57) ABSTRACT

A switch assembly, a system, and a method are provided. One such switch assembly includes a first connection bus to connect to a power source or a load and a second connection bus to connect to one of a second power source or the load. The switch assembly includes a shaft, a driving mechanism to engage the shaft, and a toggle arm connected to the first connection bus and secured to the driving mechanism. The switch assembly includes a pivot arm electrically connected to the second connection bus and including a contact pad. The shaft is structured to rotate the toggle arm from a closed position to an open position by rotating the driving mechanism, and in the closed position, a contact pad of the toggle arm contacts the contact pad of the pivot arm. The pivot arm is maintained substantially parallel to the second connection bus.

20 Claims, 6 Drawing Sheets

(58) Field of Classification Search
CPC ........ H01H 33/00; H01H 33/04; H01H 33/08; H01H 33/20; H01H 33/42; H01H 2033/00; H01H 2033/02; H01H 2033/028; H01H 2033/04; H01H 2033/42; H01H 2033/662; H01H 1/00; H01H 1/12; H01H 1/18; H01H 1/2041; H01H 1/2058; H01H 1/22; H01H 1/221; H01H 1/36; H01H 1/225; H01H 9/00; H01H 9/0038; H01H 9/46; H01H 9/26; H01H 9/30; H01H 9/32; H01H 9/34; H01H 2300/018
USPC ........................................................ 200/244
See application file for complete search history.

(56) References Cited

U.S. PATENT DOCUMENTS

| | | |
|---|---|---|
| 2003/0090348 A1 | 5/2003 | Simms |
| 2004/0006257 A1 | 1/2004 | Burch et al. |
| 2004/0016627 A1 | 1/2004 | Rademacher et al. |
| 2010/0288610 A1 | 11/2010 | Krieger et al. |
| 2012/0090972 A1 | 4/2012 | Yoshida et al. |
| 2014/0232490 A1 | 8/2014 | Plude et al. |
| 2014/0268505 A1 | 9/2014 | Evans et al. |
| 2019/0006881 A1 | 1/2019 | Zhou et al. |

\* cited by examiner

FLAT FORCE BLOW-ON SWITCH

CROSS-REFERENCE TO RELATED APPLICATIONS

The present application is the national stage entry of International Patent Application No. PCT/US2020/038457, filed Jun. 18, 2020, which claims the benefit of priority to U.S. Provisional Patent Application No. 62/864,544 filed Jun. 21, 2019, the entire contents of which are incorporated herein by reference.

FIELD

This present disclosure relates to switches, such as an automatic transfer switch.

BACKGROUND

A switch is used to connect or disconnect a current path between electrical conductors or contacts. For example, an automatic transfer switch may be used to switch an electric load back and forth between a primary power source, such as a utility, and a secondary power source, such as a generator. Transferring power from the primary to the secondary source happens, for example, when the utility experiences a blackout. When the power outage is over, the automatic transfer switch switches the power source back to utility power. A design that allows the blow-on force to be present regardless of the current direction is desired, as well as a design that reduces arcing, reduces costs, and facilitates maintenance and service.

SUMMARY

One embodiment relates to a switch assembly including a first connection bus, a second connection bus, a shaft, a driving mechanism having a toggle arm, and a pivot arm. The first connection bus is structured to connect to a power source or to a load. The second connection bus is structured to connect to one of a second power source or the load. The driving mechanism is configured to engage the shaft. The toggle arm is electrically connected to the first connection bus. The toggle arm has a first end and a second end opposite the first end, where the first end is secured to the driving mechanism. The toggle arm includes a contact pad configured on the second end. The pivot arm is electrically connected to the second connection bus and has a contact pad proximate to a first end of the pivot arm. The shaft is structured to rotate the toggle arm from a closed position to an open position by rotating the driving mechanism, wherein in the closed position the contact pad of the toggle arm contacts the contact pad of the pivot arm. The pivot arm is maintained substantially parallel to the second connection bus.

Yet another embodiment relates to a system. The system includes a first connection bus, a plurality of generators, a second connection bus, a shaft, a driving mechanism having a toggle arm, and a pivot arm. The plurality of generators is structured to transmit power to a load. The first connection bus is structured to connect to one of the plurality of generators or the load. The second connection bus is structured to connect to another of the plurality of generators or the load. The driving mechanism is configured to engage the shaft. The toggle arm is electrically connected to the first connection bus. The toggle arm has a first end and a second end opposite the first end, where the first end is secured to the driving mechanism. The toggle arm includes a contact pad configured on the second end. The pivot arm is electrically connected to the second connection bus and has a contact pad proximate to a first end of the pivot arm. The shaft is structured to rotate the toggle arm from a closed position to an open position by rotating the driving mechanism, wherein in the closed position the contact pad of the toggle arm contacts the contact pad of the pivot arm. The pivot arm is maintained substantially parallel to the second connection bus.

Yet another embodiment relates to a method of making an automatic transfer switch. The method comprises providing, on a cassette, a first connection bus, the first connection bus structured to connect to one of a power source or a load. The method further comprises providing, on the cassette, a second connection bus, the second connection bus structured to connect to one of a second power source or the load. The method further comprises providing, on the cassette, a shaft. The method further comprises providing, on the cassette, a driving mechanism, the driving mechanism rotatably connected to the shaft. The method further comprises connecting a toggle arm to the driving mechanism, the toggle arm having a first end and a second end opposite the first end, wherein the first end is secured to the driving mechanism. The method further comprises electrically connecting the toggle arm to the first connection bus. The method further comprises providing, on the second end of the toggle arm, a contact pad. The method further comprises providing, on the cassette, a pivot arm maintained substantially parallel to the second connection bus. The method further comprises electrically connecting the pivot arm to the second connection bus. The method further comprises providing, on the pivot arm, a contact pad proximate to a first end of the pivot arm. The shaft is structured to rotate the toggle arm from a closed position to an open position by rotating the driving mechanism, wherein in the closed position the contact pad of the toggle arm contacts the contact pad of the pivot arm.

These and other features, together with the organization and manner of operation thereof, will become apparent from the following detailed description when taken in conjunction with the accompanying drawings.

DETAILED DESCRIPTION

Figure 1A:
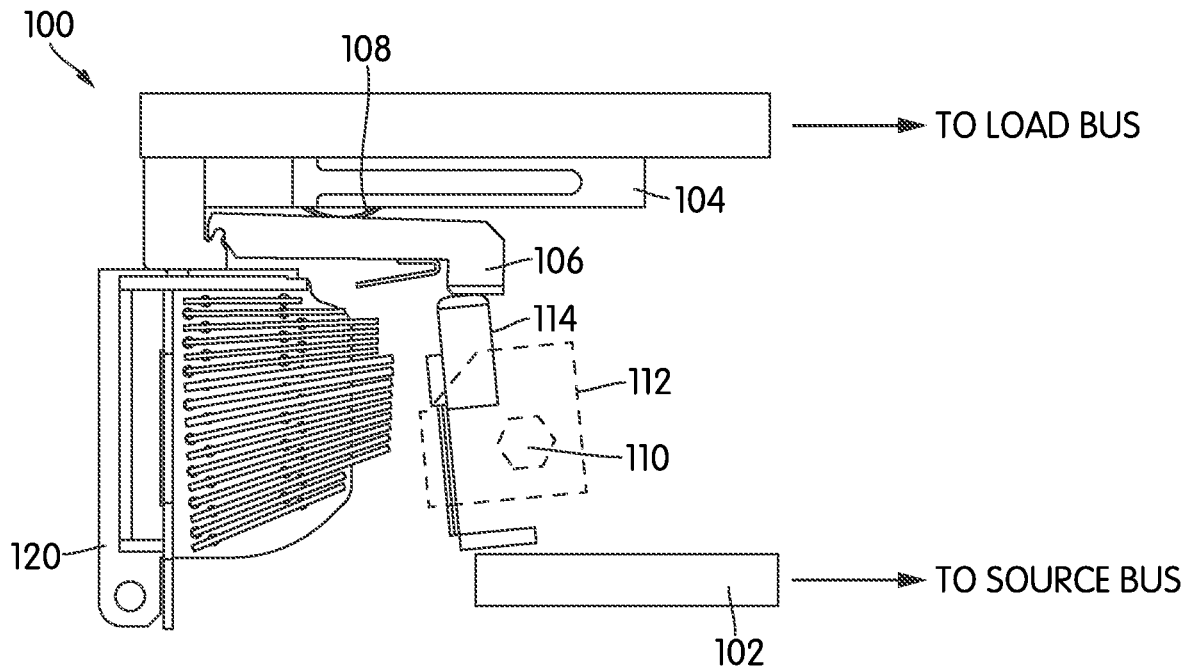
FIG. 1A is a schematic diagram of a switch assembly moving to a closed position, according to an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Referring to the figures generally, various embodiments disclosed herein relate to a switch assembly. In some embodiments, the switch assembly is a single-pole single-throw switch. The switch assembly may be configured for one phase or multiple phases. In some embodiments, the switch assembly may be configured as an automatic transfer switch (ATS), and may be coupled to an electric load and a power source, such as a power generator.

In some embodiments, a switch assembly is provided with a toggle arm and a pivot arm, each connected to one of a source connection bus or a load connection bus. When the switch assembly is in an ultimate closed position, a contact pad of the toggle arm engages a contact pad of the pivot arm, allowing electricity to flow through the switch assembly. The toggle arm may be rotated approximately 90° to an ultimate open position. In some embodiments, one or more arcing horns are selectively shaped and disposed on the pivot arm to control arcing during switching operation. In some embodiments, when the switch assembly is in an ultimate open position, a contact pad of the toggle arm faces an arc chute configured to collect potential arcing that may occur during normal operation.

Embodiments disclosed herein provide advantages over current and existing designs. For example, the toggle arm and the pivot arm may be electrically connected to either the source connection bus or the load connection bus, as the switch assembly can be configured to operate regardless of the electric current direction. Furthermore, switching between closed and open positions causes a contact pad of the toggle arm to wipe against a contact pad of the pivot arm, allowing the contact pads to self-clean. In some embodiments, positioning the pivot arm parallel to a load conductor allows for a uniform flux density and force across the pivot arm. This configuration may allow for a shorter arm and with stronger structural rigidity, thereby requiring less material to achieve similar performance levels and ratings. The reduction in mass lowers the required force to rotate the toggle arm, and the switch assembly may be opened quicker with less arcing. Furthermore, embodiments described herein allow the pivot arm to be positioned closer to the connection bus, generating stronger blow-on forces.

The switch assembly may be configured in an open design format in some embodiments. The open design format may facilitate convenience of inspections, easier disassembly and repair, better air flow and cooling because of less heat trapping on high resistance contacts and pivot points. This open format also allows for placement of an arc chute in close alignment to the contacts as described herein. Embodiments disclosed herein may be configured for a single power source or multiple power sources. For example, additional power sources can be facilitated by configuring the switch assembly in a dual-sided manner (with two switches in a cartridge cassette sharing a dual sided common central load bus, or two switch assemblies coupled to separate sources and a common coupled central load buses), configuring additional assemblies in parallel to a source connection, and/or daisy-chaining additional switch assemblies as described herein.

Figure 1B:
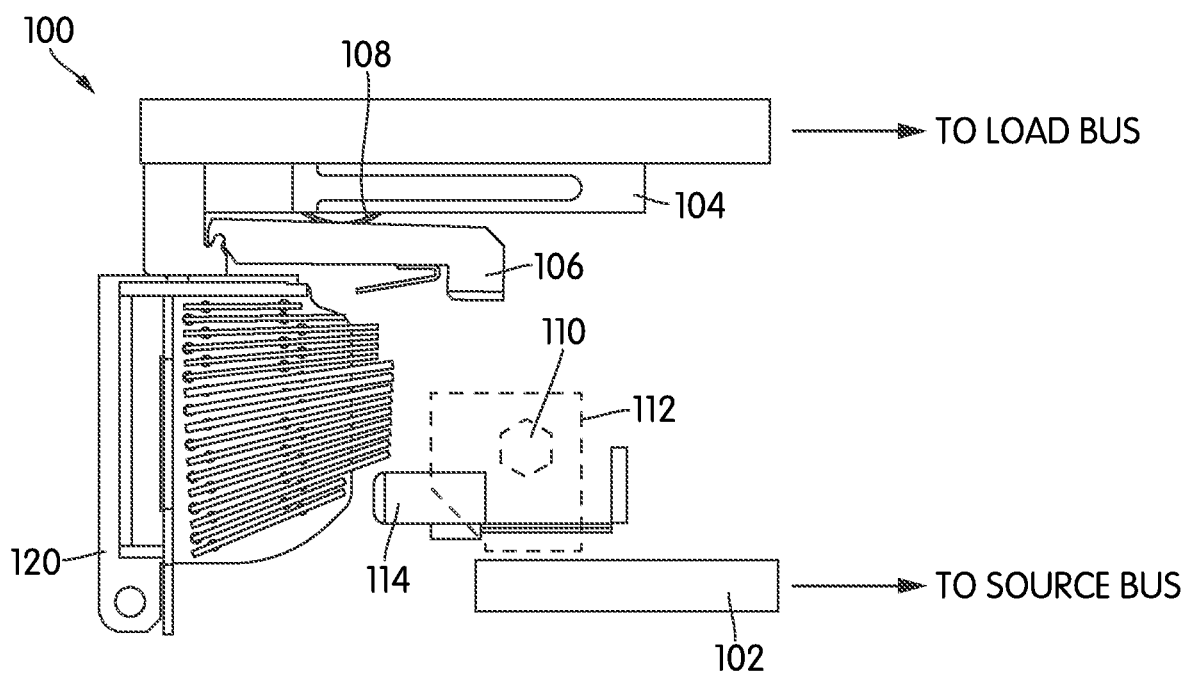
FIG. 1B is a schematic diagram of the switch assembly of FIG. 1A at an open position, according to an example embodiment.

Referring to FIGS. 1A and 1B, a schematic diagram of a switch assembly 100 is shown according to some embodiments. FIGS. 1A and 1B illustrate operational features of the switch assembly 100. Further details of the structure and operation of the switch assembly 100 are described herein with reference to the subsequent figures. The switch assembly 100 is shown to include a pivot arm 106 electrically connected to a load connection bus 104 and a toggle arm 114 electrically connected to a source connection bus 102. In other implementations, the pivot arm 106 may be electrically connected to the source connection bus 102 and the toggle arm 114 may be electrically connected to the load connection bus 104 (the direction of current flow does not impact the blow-on function in some embodiments).

FIG. 1A shows the toggle arm 114 of the switch assembly 100 moving to an ultimate closed position, and FIG. 1B shows the toggle arm 114 of the switch assembly 100 rotated to an ultimate open position. As used herein, the "closed position" refers to the situation in which a contact pad of the toggle arm 114 engages a contact pad of the pivot arm 106. The "open position" refers to the situation in which the contact pad of the toggle arm 114 disengages the contact pad of the pivot arm 106.

A belt spring 108 is shown to be located between the pivot arm 106 and load connection bus 104 and is configured to bias the pivot arm 106 away from the load connection bus 104. In some embodiments, during normal operation and when the switch assembly 100 is in a closed position, a contact pad of the pivot arm 106 is held against a contact pad of the toggle arm 114 by the force of the belt spring 108.

When the switch assembly 100 moves to an open position, torque is applied to a driving shaft 110, transferred to the driving mechanism 112, and then to the toggle arm 114. This causes the toggle arm 114 and the pivot arm 106 contacts to swipe off of each other and the toggle arm 114 to rotate back towards and through an arc chute 120. The force of the belt spring 108 lifts the pivot arm into a pivot stopper, and pivot arm arcing horns (pivot stopper and arcing horns not shown in the present figures) help direct the arc up through the arc chute 120 until it is eventually extinguished. During closing, torque is applied to the driving shaft 110 in the opposite direction, transferred to the driving mechanism 112, and then to the toggle arm 114. This causes the toggle arm 114 to rotate back towards the pivot arm 106 until the contacts of the toggle arm 114 and the pivot arm 106 swipe back over each other, pushing the pivot arm 106 back. In the specific embodiment of FIG. 1A, the driving mechanism is shown as a driving cam. But it should be understood that in other implementations, the driving mechanism could be a different type of driving mechanism, such as a linear driver.

During normal operating conditions, the blow-on force between the pivot arm 106 and the toggle arm 114 acts at a minimum level, helping (apart from the force of the belt spring 108) to keep the pivot arm 106 and the toggle arm 114 in contact. During a fault current event, blow-on force is generated between the pivot arm 106 and connection bus 104 due to the opposite current direction flow. Since the current flow directions are opposite in the pivot arm 106 and the load connection bus 104, a repulsive electromagnetic force is induced that pushes the pivot arm 106 away from the load connection bus 104. This is the blow-on force that biases the contact pad of the pivot arm 106 towards the contact pad of the toggle arm 114 and assists the closing force provided by the spring 108. The blow-on force acts to keep the pivot arm 106 and the toggle arm 114 in contact, which limits arcing as compared to other designs. The limiting of the arcing helps to increase the life of the contacts between the pivot arm 106 and the toggle arm 114.

In some implementations, the switch assembly 100 may be configured for one or more additional power sources by configuring the switch assembly 100 to be dual sided. For example, multiple switch assemblies 100 may be configured in parallel using a central load bus bar and a switch assembly coupled to the central load bus bar for each power source or daisy-chained front to back with coupled source bars to maintain proper blow-on current flow. In this regard, the switch assembly 100 may be configured for a system having two power sources (e.g., a utility and a power generator) or more than two power sources (e.g., a battery, a second power generator). In some implementations, the switch assembly 100 or a system having a number of switch assemblies 100 may be configured as switch gear and/or circuit breaker operation.

Figure 2:
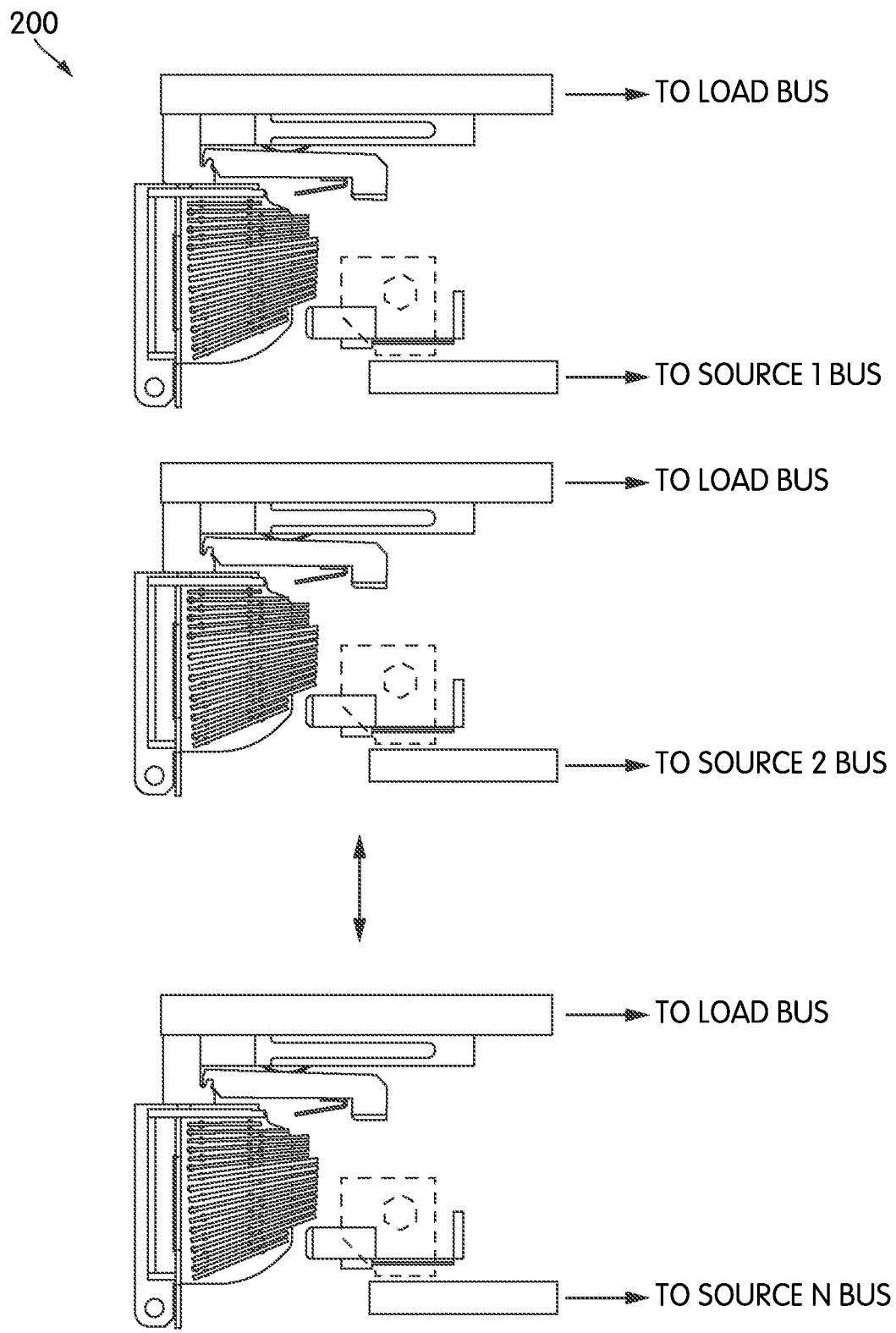
FIG. 2 is a schematic diagram of a system of a plurality of switch assemblies, according to an example embodiment.

Referring to FIG. 2, in some implementations, a system 200 may be configured with one or more switch assemblies 100. In some embodiments, multiple switch assemblies 100 may be shorted together in parallel for scalable current carrying capability to a single source and/or multiple isolated sets can be actuated together to support multiple phases or source/load combinations. A plurality of switch assemblies 100 may also be provided for switching power to a load from a number (up to N) of power sources (e.g., a power generator, battery, wind turbine, solar power system). In this example embodiment, one switch assembly 100 may be provided for each of the plurality of power sources and may be configured as an ATS to switch power to the load from the corresponding power source.

Figure 3A:
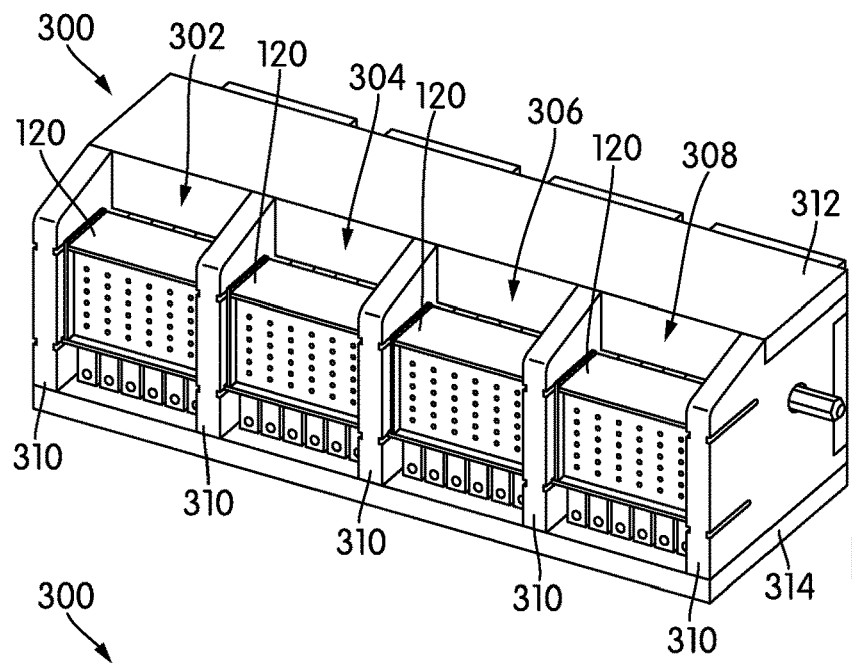
FIG. 3A is a front perspective view of a switch assembly configured for three-phase power, according to an example embodiment.
Figure 3B:
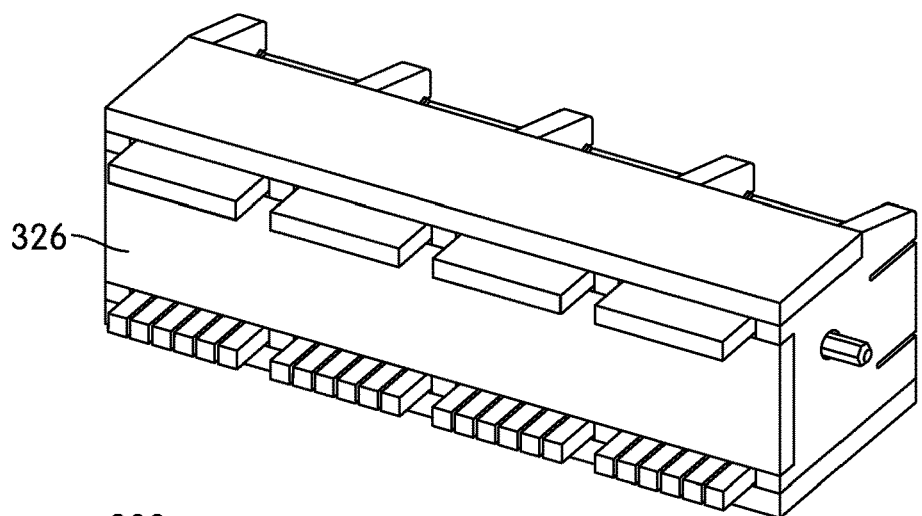
FIG. 3B is a rear perspective view of the switch assembly of FIG. 3A, according to an example embodiment.

Referring to FIGS. 3A and 3B a front perspective view and a rear perspective view, respectively of a switch assembly 300 configured for a three-phase power supply, according to some embodiments. The switch assembly 300 may be configured as described with reference to the switch assembly 100 in some embodiments. For example, FIG. 3A shows one arc chute 120 provided for each of the portion 302, the portion 304, the portion 306, and the portion 308.

In some embodiments, the switch assembly 300 is provided as an ATS switch "cassette" or switch housing. It should be understood, however, that the switch assembly 300 may be configured for any suitable implementation. FIG. 3A shows portion 302, portion 304, portion 306, and portion 308. In some embodiments, each of the portion 302, the portion 304, the portion 306, and/or the portion 308 corresponds to electrical connections for one phase of a multi-phase electric supply, a neutral connection, and/or a ground connection. In other implementations, more or fewer portions may be provided with the switch assembly 300.

FIG. 3A shows a plurality of phase barriers 310, which may be configured to electrically isolate each of the portions 302, 304, 306, 308. In some embodiments, one phase barrier 310 is provided between each of the portions 302, 304, 306, 308. In some embodiments, one barrier 310 is provided on each end of the switch assembly 300. The phase barrier 310 may be composed of any suitable composition, such as an insulating material, and may be configured with any suitable size and shape.

Figure 3C:
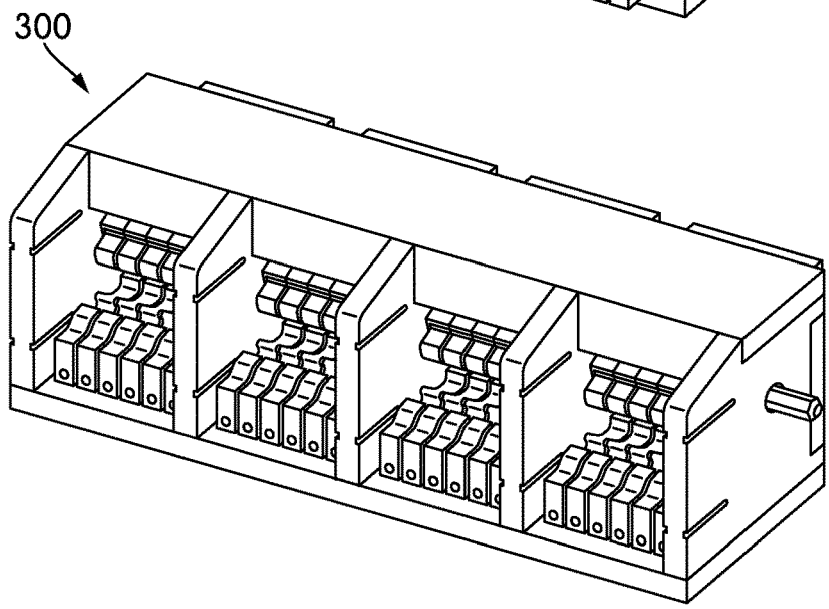
FIG. 3C is a front perspective view of the switch assembly of FIG. 3A without arc chutes, according to an example embodiment.

In some embodiments, the switch assembly 300 includes a top cover 312, a base 314, and a rear cover 326. The top cover 312, the base 314, and the rear cover 326 may be of any suitable size and shape. For example, one or more of the top cover 312, the base 314, and the rear cover 326 may have a width dimension value corresponding to a width dimension value of the switch assembly 300 as shown in FIGS. 3A-3C. The top cover 312, the base 314, and the rear cover 326 may be made of any suitable material. In some embodiments, the base 314 and the rear cover 326 are made of an insulating material. In some embodiments, one or more of the top cover 312, the base 314, and the rear cover 326 may be removable with or without the use of a tool to facilitate inspection, maintenance, and the like. It is noted that, in some embodiments, a common actuation mechanism can be provided with use of a common driving shaft across all phase portions 302, 304, 306, and 308, or each phase can be driven by a separate local actuation mechanism and drive shaft.

FIG. 3C shows a front perspective view of the switch assembly 300 with the arc chute 120 removed according to some embodiments. In some embodiments, the arc chute 120 is configured to be removable with or without the use of a tool. In some embodiments, the arc chute 120 is secured to the switch assembly 300 by snap fit or one or more fasteners (not shown in the present figures). Allowing the arc chute 120 to be removable may provide convenient access to the contacts and other internal components of the switch assembly 300, facilitating installation, inspection, and maintenance of the switch assembly 300.

Figure 4A:
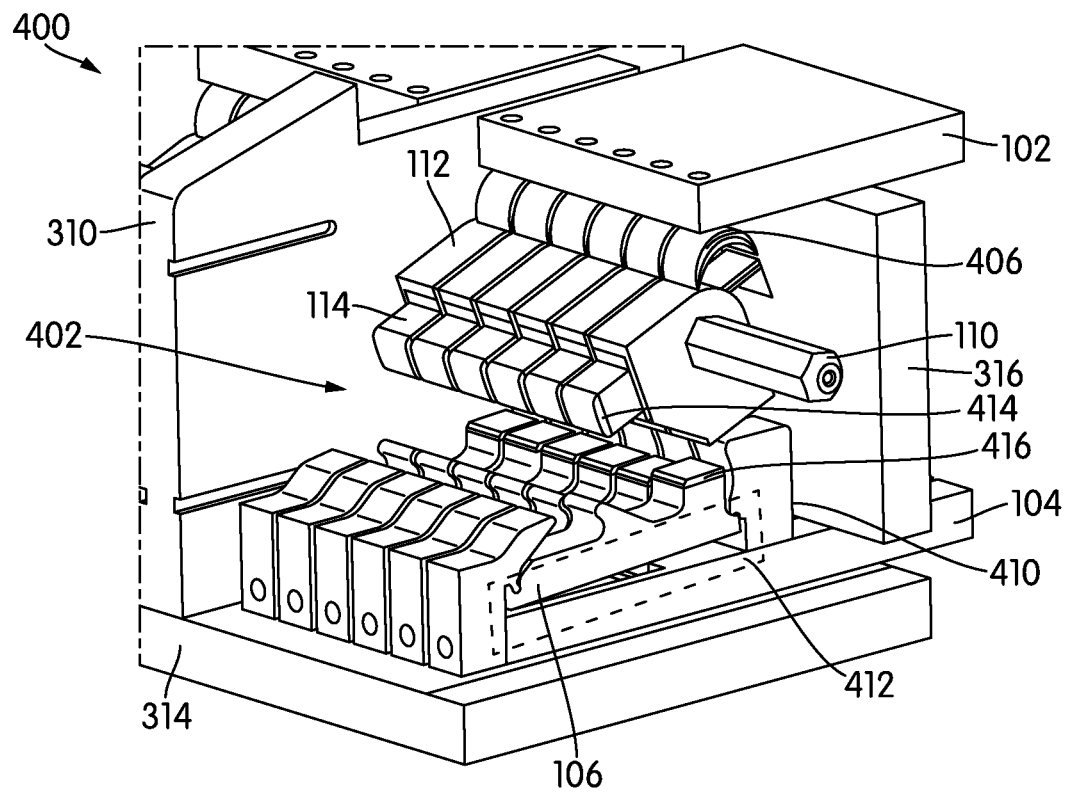
FIG. 4A is a perspective view of a portion of the switch assembly of FIG. 3A, according to an example embodiment.
Figure 4B:
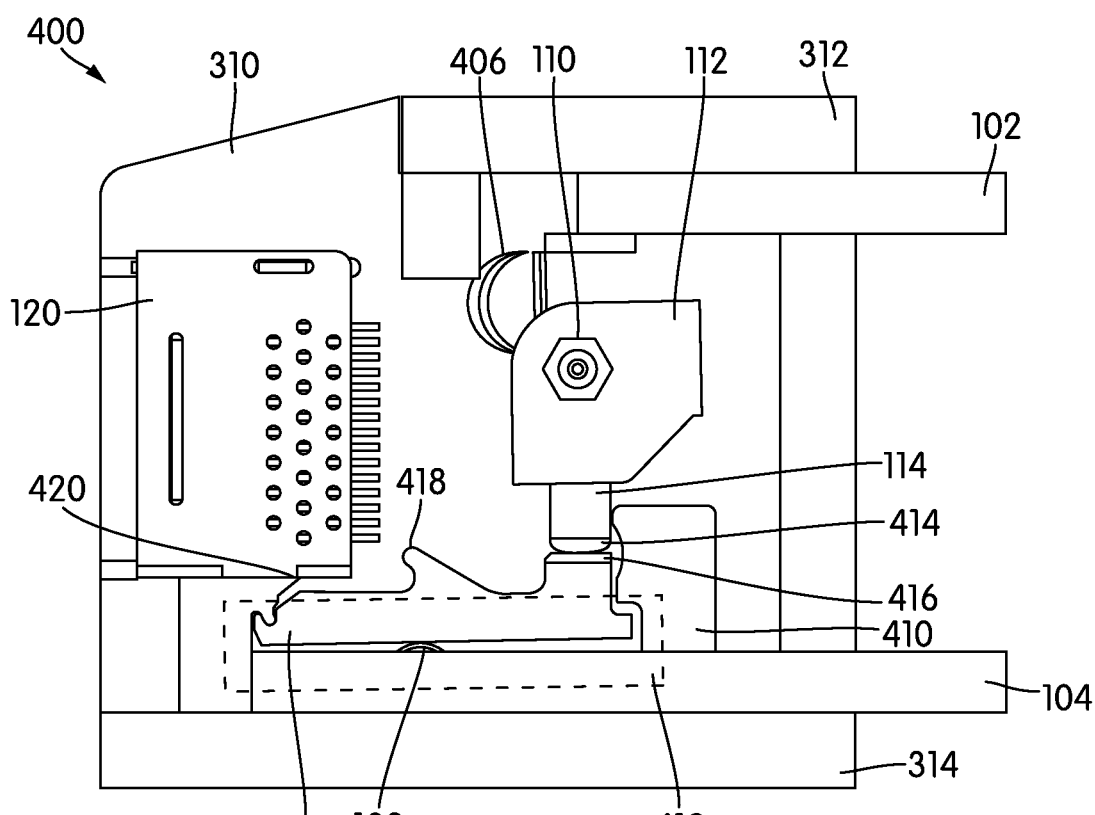
FIG. 4B is a side view of a portion of the switch assembly of FIG. 3A, according to an example embodiment.

Referring to FIGS. 4A and 4B, a perspective view and side view, respectively, of a portion 400 of a switch assembly is shown according to some embodiments. In some embodiments, the portion 400 corresponds to a portion of the switch assembly 300 (e.g., one of the portions 302, 304, 306, 308 as described herein).

The flexible bus cable 406 is configured to provide an electric conductive path between the source connection bus 102 and the toggle arm 114. In this regard, the toggle arm 114 and/or the driving mechanism 112 may be configured to receive the flexible bus cable 406. In some embodiments, the flexible bus cable 406 is a flexible copper braid cable. As shown in FIG. 4B, when the switch 100 is in a closed position, the contact pad 416 of the pivot arm 106 contacts a contact pad 414 of the toggle arm 114. This provides an electric path for current to flow from the source connection bus 102, through the flexible bus cable 406 and the toggle arm 114, and to the load connection bus 104 via the pivot arm 106.

The contact pad 414 and the contact pad 416 may have any suitable size, shape, and material. In some embodiments, the contact pad 414 and/or the contact pad 416 are configured to facilitate switching operation and/or control arcing. For example, the contact pad 414 and/or the contact pad 416 may incorporate an initial bulge or bluff face to pull arcing and prevent erosion of the final contact face. Guide grooves and ridges may also be cut into the faces of the contact pad 414 and/or the contact pad 416 for self-alignment.

In some embodiments, a pivot stopper 410 is provided to prevent rotation of the toggle arm 114 from traveling past a predetermined position. For example, the pivot stop 410 may be configured to optimize contact between a surface of the contact pad 414 and a surface of the contact pad 416. In some embodiments, the pivot stopper 410 includes a recess configured to receive a shoulder provided on one end of the pivot arm 106 to retain the pivot arm. In some embodiments, the pivot arm 106 includes a lip provided on a second end of the pivot arm 106 to facilitate angular movement of pivot arm 106 about the lip and pivot point. The recess, the shoulder, and the lip are described in further detail with reference to FIGS. 5A-5D.

In some embodiments, the pivot arm 106 is configured with a first arcing horn 418 and a second arcing horn 420. The first arcing horn 418 and the second arcing horn 420 are configured to control arcing during switching operation of the switch assembly in some embodiments. For example, when the toggle arm 114 begins rotating from a closed position to an open position, arcing may be initially directed to the first arcing horn 418. As the toggle arm 114 continues its rotation to an ultimate closed position, the nearest available conductive path becomes the second arcing horn 420, causing arcing to be directed to the second arcing horn 420. When the toggle arm 114 reaches its ultimate open position, arcing may be directed to the arc chute 120. The arcing horns 418, 420 may be of any suitable size and shape, and may be configured at any suitable position on the pivot arm 106.

The portion 400 is shown to include a plurality of single-conductor assemblies 402. By configuring the switch assembly 300 with a plurality of single-conductor assemblies 402 coupled in parallel, the electrical load of the portion 400 may be divided among each of the single-conductor assemblies 402. This may facilitate handling larger electrical loads and maintenance and troubleshooting of the single-conductor assemblies 402. Each of the single-conductor assemblies 402 may be electrically connected to the source connection bus 102 via a flexible bus cable 406.

In some embodiments, a debris shield 412 may be positioned along a length of the single-conductor assembly 402 as shown in FIGS. 4A and 4B. The debris shield 412 may be configured to reduce or prevent arcing from reaching the belt spring 108 and surrounding areas length of the single-conductor assembly 402. The debris shield 412 may be of any suitable material, size, shape, and location. In some embodiments, one debris shield 412 is provided between each of the single-conductor assemblies 402.

Figure 5A:
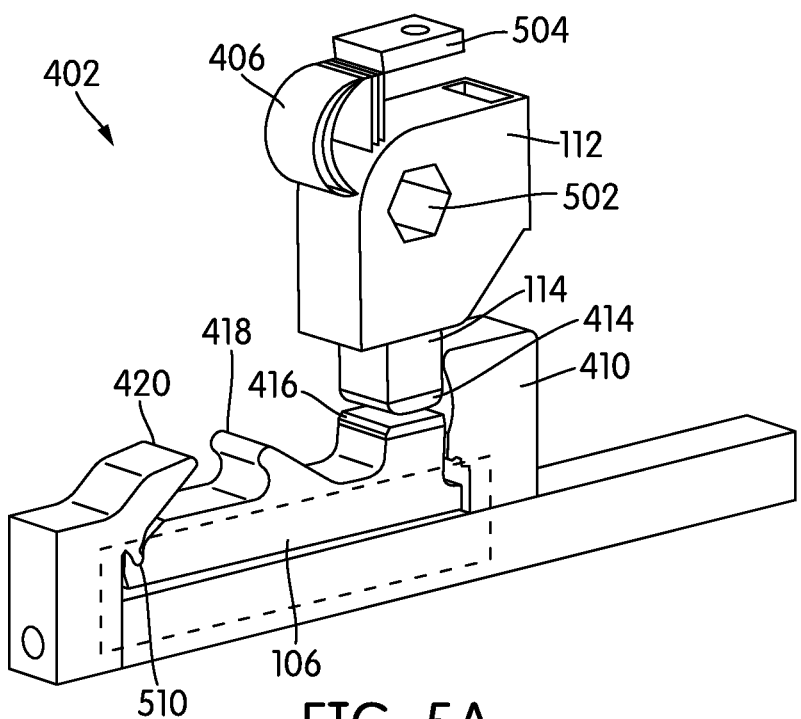
FIG. 5A is a perspective view of a single-conductor assembly provided with the switch assembly of FIG. 3A, according to an example embodiment.

FIG. 5A shows one of the single-conductor assemblies 402 in greater detail. As shown, the single-conductor assembly 402 may be configured with a driving mechanism (e.g., the driving mechanism 112), a toggle arm (e.g., the toggle arm 114), a pivot arm (e.g., the pivot arm 106), as described with reference to the switch assembly 100. The single switch assembly 402 is shown to include a bus connection 504 configured to couple the flexible bus cable 406 to the source connection bus 102. The driving mechanism 112 is shown to include an aperture 502 configured to engage the drive shaft 110, allowing rotation of the drive shaft 110 to cause rotational movement of the driving mechanism 112 as described herein. The drive shaft 110 may be of any suitable size and shape in various embodiments. The aperture 502 may be of any suitable size and shape in various embodiments and may be configured at any suitable location of the driving mechanism 112.

Figure 5B:
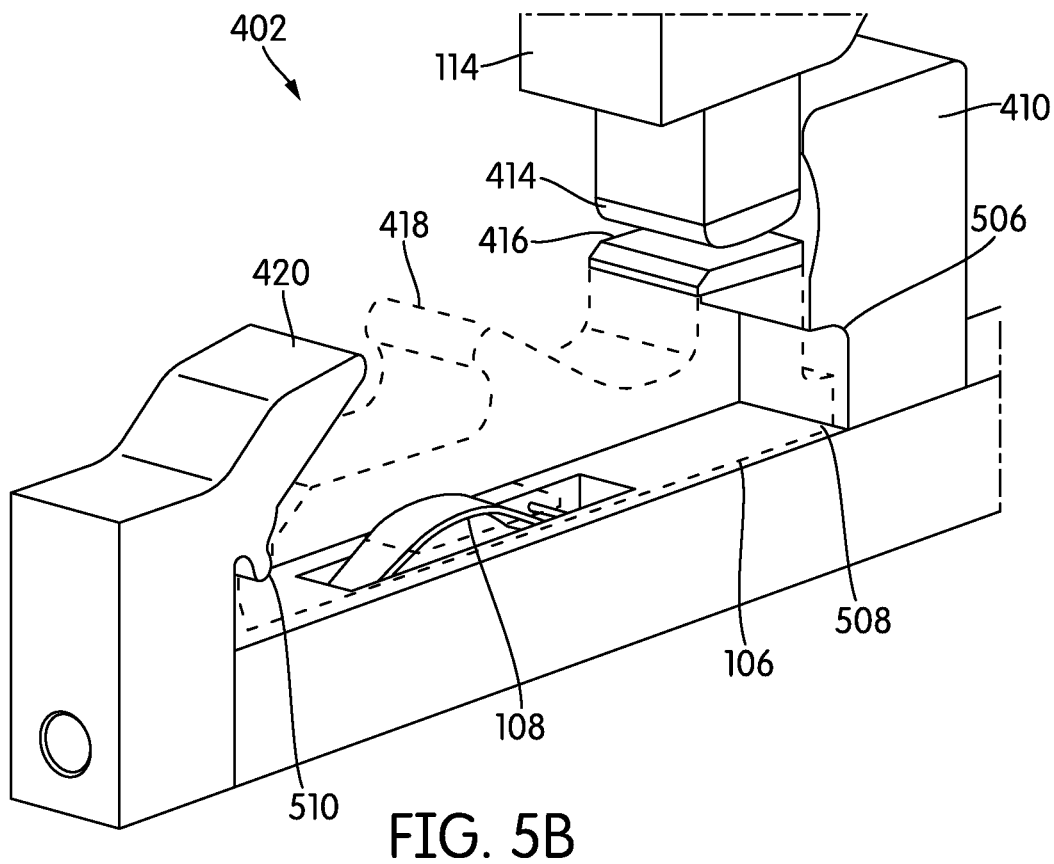
FIG. 5B is another perspective view of a single-conductor assembly provided with the switch assembly of FIG. 3A, according to an example embodiment.

Referring to FIG. 5B, a detailed view of the pivot arm 106, the belt spring 108, and the pivot stopper 410 are shown in greater detail. The pivot arm 106 may be configured with a shoulder 508 on one end and a lip 510 on the opposite end of the pivot arm 106. The lip 510 may be configured to engage a lip of the load connection bus 104 (or a component electrically connected to the load connection bus 104), facilitating angular movement of the pivot arm 106 about the lip 510.

The pivot stopper 410 may include a recess 506, which may be configured to receive the shoulder 508. In some embodiments, the recess 506 and the shoulder 508 may be configured to limit rotational movement of the pivot arm 106. As described herein, the belt spring 108 creates an upward force of the pivot arm 106. This upward force causes the pivot arm 106 to rotate about the lip 510, and this rotation is stopped when the shoulder 508 contacts an inner surface of the recess 506. In some embodiments, the recess 506 may be configured to allow the shoulder 508 between two to five degrees of angular movement.

Figure 5C:
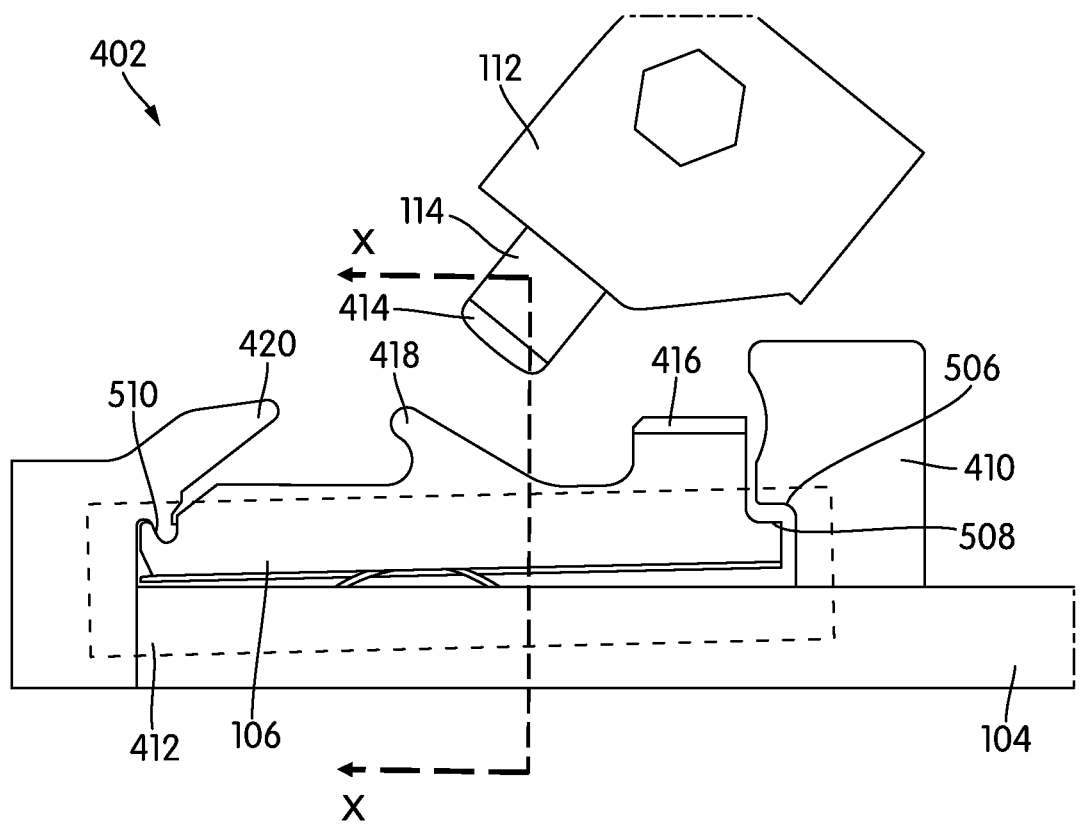
FIG. 5C is another perspective view of a single-conductor assembly provided with the switch assembly of FIG. 3A, according to an example embodiment.
Figure 5D:
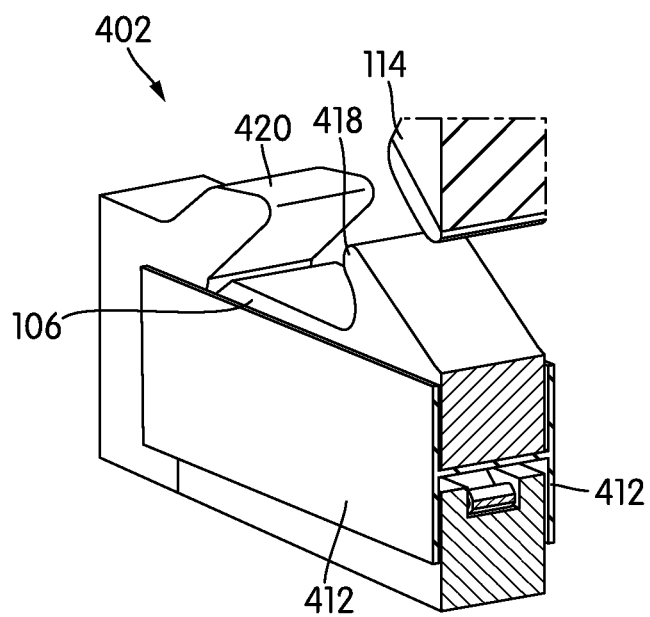
FIG. 5D is a cross-sectional view schematic drawing of the single-conductor assembly of FIG. 5C taken along the line labeled X-X' in FIG. 5C, according to an example embodiment.

Referring to FIGS. 5C and 5D, a cross-sectional view of the single-conductor assembly 402 illustrates how the switch assembly 300 may be configured to guide arcs during opening and closing operations, according to some embodiments. FIG. 5D shows a cross-sectional view schematic drawing of the single-conductor assembly 402 along the line labelled X-X' in FIG. 5C. The arcing horns 418, 420 of the pivot arm 106 may be configured to provide a path for arcing that moves away from the contact pad 416 when switching form an ultimate closed position to an ultimate open position. Because electricity arcs gravitate to sharp corners and points, the arcing horns 418, 420 pull arcs away from the contact pad 414 when actuating, stretching out and guiding arcing towards the arc chute 120 to be extinguished.

Embodiments disclosed herein provide advantages over current and existing designs. For example, in some embodiments, a non-angled pivot arm is held parallel to the central load conductor for a uniform flux density and resulting blow-on emf force across the pivot arm, rather than non-linear flux in current and existing systems, in particular those with highly angled pivot arms when actuated. Such embodiments may allow for a shorter arm, and may require less structural rigidity, material (uses less copper for same contact pressure), and/or copper hardening (and annealing avoidance when brazing contact on). In some embodiments, the pivot arm is configured to be relatively static (limited angular movement) using a pivot stop and a belt spring. In some embodiments, a toggle arm with a source contact pad rotates into alignment to make contact with a load contact pad of the pivot arm. This rotating motion allows for a wiping motion to self-clean the contact pads.

In some embodiments, arc chutes are located on the opposite side of the cassette as the connection busses to facilitate maintenance and service. The introduction of a toggle arm utilizing a swiping contact with the pivot arm allows the pivot arm to be located closer to the connection bus and generates stronger blow-on force. Some embodiments disclosed herein require less metal, metal alloy, and/or material (e.g., copper) than current and existing architectures. For example, up to 40% less metal may be required, while maintaining higher rating (current, fault current, overload, voltage withstand), and enabling potential of operation without circuit breakers. The reduction in mass lowers the required force to rotate the toggle shaft, and the switch may be opened quicker with smaller arcs.

The switch assembly may be configured in an open design format in some embodiments. The open design format may facilitate convenience of inspections, easier disassembly and repair, better air flow and cooling because of less heat trapping on high resistance contacts and pivot points. This open format also allows for easy placement of an arc chute in close alignment to the contacts as described herein.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

The construction and arrangements of the systems as shown in the various exemplary embodiments, are illustrative only. Although only certain embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As may be utilized herein, the terms "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the drawings. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A switch assembly comprising:
   a first connection bus structured to connect to one of a first power source or a load;
   a second connection bus structured to connect to a second power source in a state where the first connection bus is connected to the load, or the load in a state where the first connection bus is connected to the first power source;
   a shaft;
   a driving mechanism configured to engage the shaft;
   a toggle arm electrically connected to the first connection bus, the toggle arm having a first end and a second end opposite the first end, wherein the toggle arm is secured to the driving mechanism proximate to the first end and wherein the toggle arm comprises a contact pad proximate to the second end; and
   a pivot arm electrically connected to the second connection bus, wherein the pivot arm comprises a contact pad proximate to a first end of the pivot arm;
   wherein the shaft is structured to rotate the toggle arm from a closed position to an open position by rotating the driving mechanism, wherein in the closed position the contact pad of the toggle arm contacts the contact pad of the pivot arm; and
   wherein the pivot arm is maintained substantially parallel to the second connection bus.

2. The switch assembly of claim 1, wherein the driving mechanism is a driving cam.

3. The switch assembly of claim 1, wherein the shaft is a hex shaft.

4. The switch assembly of claim 1, wherein the shaft is configured to rotate the toggle arm between eighty and ninety degrees when the toggle arm is rotated to the open position.

5. The switch assembly of claim 1, wherein a rotation of the pivot arm is controlled to cause an angle between a plane in which the pivot arm is disposed and a plane in which the second connection bus is disposed to be no greater than five degrees.

6. The switch assembly of claim 1, wherein the switch assembly is configured to a 3-phase power supply, and wherein the switch assembly comprises a number of portions corresponding to each conductor of the 3-phase power supply, wherein the switch assembly further comprises a phase barrier provided between each of the portions, the phase barrier configured to electrically isolate each of the portions.

7. The switch assembly of claim 1, further comprising an arc chute positioned proximate to a second end of the pivot arm opposite the first end, the arc chute configured to direct arcing from the toggle arm to the arc chute when the toggle arm is rotated to the open position.

8. The switch assembly of claim 7, wherein the arc chute is configured to be removable.

9. The switch assembly of claim 1, further comprising a pivot stopper, the pivot stopper configured to prevent the toggle arm from travelling past the contact pad of the pivot arm when the toggle arm is rotated to a closed position, the pivot stopper positioned proximate to the first end of the pivot arm.

10. The switch assembly of claim 9, wherein the pivot stopper comprises a recess configured to receive a shoulder of the pivot arm, wherein the recess is configured to prevent the first end of the pivot arm from rotating by more than a threshold amount.

11. A system comprising:
a plurality of generators structured to transmit electric power to a load;
a first connection bus structured to connect to one of the plurality of generators or the load;
a second connection bus structured to connect to another of the plurality of generators in a state where the first connection bus is connected to the load or the load in a state where the first connection bus is connected to the one of the plurality of generators;
a shaft;
a driving mechanism configured to engage the shaft;
a toggle arm electrically connected to the first connection bus, the toggle arm having a first end and a second end opposite the first end, wherein the toggle arm is secured to the driving mechanism proximate to the first end and wherein the toggle arm comprises a contact pad proximate to the second end; and
a pivot arm electrically connected to the second connection bus, wherein the pivot arm comprises a contact pad proximate to a first end of the pivot arm;
wherein the shaft is structured to rotate the toggle arm from a closed position to an open position by rotating the driving mechanism, wherein in the closed position the contact pad of the toggle arm contacts the contact pad of the pivot arm; and
wherein the pivot arm is maintained substantially parallel to the second connection bus.

12. The system of claim 11, wherein a rotation of the pivot arm is controlled to cause an angle between a plane in which the pivot arm is disposed and a plane in which the second connection bus is disposed to be no greater than five degrees.

13. The system of claim 11, wherein the pivot arm comprises a first arcing horn and a second arcing horn, the first arcing horn and the second arcing horn configured to direct arcing from the toggle arm to the pivot arm when the toggle arm is rotated to an open position.

14. The system of claim 11, wherein the system is configured for a multiple-phase power supply.

15. The system of claim 11, wherein the pivot arm is maintained to provide a substantially uniform flux density with respect to the second connection bus.

16. The system of claim 11, further comprising an arc chute positioned proximate to a second end of the pivot arm opposite the first end, the arc chute configured to direct arcing from the toggle arm to the arc chute when the toggle arm is rotated to the open position.

17. The system of claim 16, wherein the arc chute is configured to be removable.

18. The system of claim 11, further comprising a pivot stopper, the pivot stopper configured to prevent the toggle arm from travelling past the contact pad of the pivot arm when the toggle arm is rotated to a closed position, the pivot stopper positioned proximate to the first end of the pivot arm.

19. The system of claim 18, wherein the pivot stopper comprises a recess configured to receive a shoulder of the pivot arm, wherein the recess is configured to prevent the first end of the pivot arm from rotating by more than a threshold amount.

20. A method of making an automatic transfer switch, comprising:
providing, on a cassette, a first connection bus, the first connection bus structured to connect to one of a first power source or a load;
providing, on the cassette, a second connection bus, the second connection bus structured to connect to a second power source in a state where the first connection bus is connected to the load, or the load in a state where the first connection bus is connected to the first power source;
providing, on the cassette, a shaft;
providing, on the cassette, a driving mechanism, the driving mechanism rotatably connected to the shaft;
connecting a toggle arm to the driving mechanism, the toggle arm having a first end and a second end opposite the first end, wherein the first end is secured to the driving mechanism;
electrically connecting the toggle arm to the first connection bus;
providing, on the second end of the toggle arm, a contact pad;
providing, on the cassette, a pivot arm maintained substantially parallel to the second connection bus;
electrically connecting the pivot arm to the second connection bus; and
providing, on the pivot arm, a contact pad proximate to a first end of the pivot arm,
wherein the shaft is structured to rotate the toggle arm from a closed position to an open position by rotating the driving mechanism, wherein in the closed position the contact pad of the toggle arm contacts the contact pad of the pivot arm.

* * * * *